(12) United States Patent
Fitton et al.

(10) Patent No.: US 7,346,369 B2
(45) Date of Patent: Mar. 18, 2008

(54) MODE MONITORING AND IDENTIFICATION THROUGH DISTRIBUTED RADIO

(75) Inventors: Michael Philip Fitton, Bristol (GB); Jonathan David Lewis, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 487 days.

(21) Appl. No.: 10/107,158

(22) Filed: Mar. 28, 2002

(65) Prior Publication Data

US 2002/0151325 A1   Oct. 17, 2002

(30) Foreign Application Priority Data

Mar. 30, 2001   (GB) ................................ 0108025.8

(51) Int. Cl.
*H04M 1/00*   (2006.01)
(52) U.S. Cl. .................. 455/553.1; 455/41.2; 455/423; 455/550.1; 455/444; 370/338
(58) Field of Classification Search ..... 455/432.1–444, 455/452.2, 550.1, 552.1–555, 556.1, 560–561, 455/11.1, 426.1, 423; 370/328, 338
See application file for complete search history.

(56) References Cited

U.S. PATENT DOCUMENTS

| 5,377,267 | A | * | 12/1994 | Suzuki et al. ............... 380/248 |
| 5,852,651 | A | * | 12/1998 | Fischer et al. ............. 379/56.2 |
| 6,134,437 | A | * | 10/2000 | Karabinis et al. ........... 455/427 |
| 6,201,499 | B1 | * | 3/2001 | Hawkes et al. ............. 342/387 |
| 6,339,698 | B1 | * | 1/2002 | Cullen ..................... 455/67.11 |
| 6,400,962 | B1 | * | 6/2002 | Yamada .................... 455/552.1 |
| 6,430,397 | B1 | * | 8/2002 | Willrett .................... 455/67.11 |
| 6,473,607 | B1 | * | 10/2002 | Shohara et al. .......... 455/343.1 |
| 6,496,493 | B1 | * | 12/2002 | Chung ........................ 370/332 |
| 6,549,524 | B1 | * | 4/2003 | Shin ........................... 370/331 |
| 6,584,318 | B2 | * | 6/2003 | Hakalin et al. ............. 455/453 |
| 6,744,753 | B2 | * | 6/2004 | Heinonen et al. ........... 370/338 |
| 2002/0031103 | A1 | * | 3/2002 | Wiedeman et al. ......... 370/316 |
| 2002/0058504 | A1 | * | 5/2002 | Stanforth ..................... 455/426 |
| 2003/0008647 | A1 | * | 1/2003 | Takatori et al. ............. 455/420 |

FOREIGN PATENT DOCUMENTS

| DE | 100 16 622 | 10/2001 |
| EP | 1 041 770 | 10/2000 |
| WO | WO 98/39936 | 9/1998 |
| WO | WO 98/57444 | 12/1998 |

OTHER PUBLICATIONS

J. Haartsen, Ericsson Review, No. 3, XP-000783249, pp. 110-117, "Bluetooth-the Universal Radio Interface for Ad Hoc, Wireless Connectivity", 1998.

* cited by examiner

*Primary Examiner*—George Eng
*Assistant Examiner*—Marcos L Torres
(74) *Attorney, Agent, or Firm*—Oblon, Spivak, McClelland, Maier & Neustadt, P.C.

(57) ABSTRACT

Independent radio communication devices can share network information directly with each other in the local area using an independent wireless link. This network information encompasses synchronisation information, interference, network configuration, neighbour cell list, paging requests, etc., and can be relevant to multiple networks, frequency carriers and/or air interface modes. Sharing the information reduces the processing requirement, the power consumption, and the bandwidth consumption of devices.

4 Claims, 4 Drawing Sheets

MODE MONITORING AND IDENTIFICATION THROUGH DISTRIBUTED RADIO

BACKGROUND OF THE INVENTION

1. Field of the Invention

The preset invention relates to a method of sharing resources between devices using wireless connectivity, and in particular to the sharing of a radio link to a remote base station or access point between several devices located within a small geographical area.

2. Description of the Related Art

A mobile phone network comprises a series of base stations covering a range of geographical areas, and a multiple of handsets. Each handset communicates with one of the base stations, and the particular base station used is selected depending on factors such as geographical location, interference, channel loading, etc.

However, an increasing problem with this arrangement is that the number of people using mobile phones is increasing rapidly, and there is only a limited amount of bandwidth available for transmission of signals to and from individual handsets. Radio links from laptop computers, personal organisers, etc., are also becoming much more common, for example, to connect to the internet (e.g. WAP), for fax, video conferencing, telematics, or for remote control of hardware devices such as domestic appliances in the home.

The traditional approach to this problem of limited bandwidth has been to introduce more and more complex methods of scheduling. Air interface modes such as TDMA (time-division multiple access), e.g. GSM (Global System for Mobile communications, are based on dividing time into slots and placing the signals of different users into different time slots. Another way of using the available bandwidth, which may be more efficient, is CDMA (code division multiple access), in which signals from multiple users are sent at the same time in the same frequency band, with the spectrum of each user's signal spread through the bandwidth of the frequency band according to a code sequence unique to the user. One of the most important implementation of CDMA is W-CDMA (wideband CDMA), which uses a 5 Mhz carrier, allowing the possibility of multimedia transmission such as video streams.

In the earlier implementation of CDMA, blind interfrequency handover could result in inadequate call quality. Instead, a mobile radio had to be able to monitor the signal strength and and quality of another carrier frequency while still maintaining the connection in the current carrier frequency. In the case of W-CDMA, this need can be overcome by having the system enter compressed mode to simultaneously monitor other carriers. In compressed mode, the system is manipulated to provide a number of contiguous slots free for measuring other channels. However, compressed mode requires a highly complex level of network management. A variety of methods can be used to establish compressed mode, for example through reduced spreading factor (perhaps with increased transmit power), increased puncturing, or higher layer signalling. In each case, the mobile terminal will suffer as the raw throughput of the channel is being reduced. In the case of reduced spreading factor, the receiver may experience greater interference (and create greater interference, if a higher base station transmit power is used). With puncturing, the error detection/correction properties of any coding may be impaired. Finally, with higher layer signalling, certain segments of data must be scheduled to not be transmitted which may degrade overall perceived quality.

In general, a mobile device may have to spend a significant amount of time monitoring: other carriers, base stations; access points within the same radio mode; or carriers, base stations or access points which are attached to another mode. This monitoring time may impact on the throughput (as observed by the user), power consumption, and the latency which is introduced before a handover to an alternative carrier, base station, access point, or mode.

In addition to the user of more complex air interface modes, wireless devices themselves are becoming increasingly complex, as a larger and larger set of radio functionality and applications are required. The trend has been towards integrating all the required technology in a single device, to allow the user flexibility of operation. This desire of highly complex functionality, flexibility and multiple air interface modes leads towards the "Software Defined Radio" concept where a flexible architecture is employed to fulfil all requirements.

In recent times it has also become feasible to provide an independent low power interconnection between devices through the use of a Wireless Personal Area Network (WPAN), such as a Bluetooth enabled WPAN. Within WPAN equipped devices, this mode of operation is likely to exist in addition to (and independently of) other capabilities, such as: cellular or Wireless Local Area Network (WLAN) transceivers; significant processing power; and other features. The provision of this independent link gives the potential for a device to utilise the resources of other devices that are attached with the wireless interconnection. This concept of a virtual device that is formed from a number of separate wireless units is described here as a distributed wireless system of distributed radio.

The separate wireless units are likely to be manufactured independently and even independently owned, but are linked through a preferably common short-range wireless link with a common communications protocol. It would also be possible to use more than one type of link within the WPAN, although there may then be more problems with the upper layers in terms of forwarding information over multiple link types.

A further problem with mobile radio device is that they tend to be battery operated, but the radio links to the base station must be of reasonably high power. This is a major factor in draining the batteries, and reducing the amount of time before recharging is necessary.

BRIEF SUMMARY OF THE INVENTION

According to the present invention there is provided a communication device comprising: first communication means for communicating with a base station or access point over a first network; and second communication means for communicating with one or more other communication devices over a second network, said other communication devices being able to communicate over said first network, wherein said communication device is adapted to send and/or receive network information of the first network over said second network.

The present invention uses the concept of distributed radio to reduce the problems of the limited available bandwidth on the radio network, the large amounts of processing required for scheduling and monitoring, and the battery drain resulting from high power radio transmissions. Resources are shared between devices using local low power wireless connectivity. Preferably, the distributed radio concept is utilised to support efficient monitoring of network information on one or more radio networks.

It is through exploiting the local wireless link that the novel aspects of this invention are achieved. Networking information available on a device is exploited by another device. It should be noted that the distributed radio concept applies equally to a large number of interconnected devices or to a limited number.

With the present invention, the network information (network monitoring information) that is available to one radio communication device is shared with other radio device(s) within a small geographical area. Provided this area is reasonably small and homogeneous, the network monitoring information will be valid across the entire distributed radio. Shared network information can include synchronisation information, interference, quality of service, network configuration, neighbour cell list, paging requests, etc. and can be relevant to multiple networks, frequency carriers and/or air interface modes.

Sharing of available network information can reduce the battery consumption of the devices and time taken to perform monitoring within the distributed radio. Furthermore, it may reduce the requirements for network management. For example, in the case of W-CDMA, monitoring through a distributed radio may remove the need to enter compressed mode.

The WPAN could include any mechanism for providing a wireless link between devices, such as the use of Short Range Devices (SRDs), Infrared connections, and industry standards such as Bluetooth. The WPAN system is preferably able to operate concurrently with the radio communication system within all devices.

Depending on the exact WPAN used, different types of WPAN network configurations may be used. For example, a network in which each device can communicate directly with every other device, or a network in which information can be forwarded between those devices which do not have direct links. The exact topology is more likely to be influenced by the format of the WPAN short range link itself. For example, Bluetooth uses a master-slave arrangement, and it would be reasonable for the Bluetooth master to act as the radio network monitoring device, and be able to forward on information such as paging requests. Alternatively, it is possible to configure a slave to be the monitoring device, in which case the monitoring information is forwarded to the master, and then forwarded on by the master to other slaves. A WPAN network topology in which devices forward information which is not intended for them could provide enhanced coverage within a certain area. However, it would be important to ensure the quality of the measurement for all devices. The forwarding devices may not themselves be interested in the measurement reports (or indeed be equipped with that radio mode).

The bandwidth of the WPAN link could either be small, only allowing the relaying of essential control signals, or it could be much larger, allowing full data relaying. A distributed radio according to the present invention could then also provide backup means for any individual radio device within it, switching to another radio transmitter in the case of the radio link to that device breaking down, e.g. due to transmitter failure, low battery, localised interference, etc.

The system may associate some form of reliability indicator with the network monitoring information. This could take the form of a measure of similarity of the radio environment as seen by the client device (receiving information from the monitoring device) and monitoring devices (which monitor the network to provide information to the clients), such as the path loss between the devices. This would give an indication of the homogeneity of the radio environment which encompasses the distributed radio. Alternatively, the client device could obtain network information from the monitoring device whilst the client device itself is still monitoring. By comparing the two sets of information, the reliability of the monitoring devices measurement reports will be established. Once the veracity of the information is established, the client device can then leave the required functionality to the monitoring device. The client device may periodically enter monitoring mode to check the reliability of the monitoring device's reports.

Devices may indicate their relative (or absolute) positions to each other and/or the serving network, in order to establish the validity of network information derived from another device within the distributed radio. Network information may be time-stamped to indicate when the measurement was taken. This allows the validity of the information to be established.

A device may enter low power mode, in which the radio network is not being monitored by that device. Instead, a designated monitoring device will forward any paging requests to the desired device via the WPAN link.

The radio network monitoring device may initiate response to the radio network on behalf of the client device. This could occur in response to a paging message. The monitoring device would respond to the radio network with the appropriate message, allowing the client device more time to obtain resynchronisation.

In the case where two devices in the WPAN are connected to different radio networks, and the first device wishes to switch over to the network of the second device, the second device initiates a connection or handover request to its radio network on behalf of the first device. If the second device sets up the connection for the first device in this way, it can then relay information to the first device to confirm that sufficient capacity is available. When handing over between modes, using handover in this way removes the need for a device to retune and start the other mode to check network loading, availability, etc.

The actual choice of which device is picked to be the monitor may be dependent on a number of factors. For example, on whether the device has mains power, and if not, then on the remaining battery power; on whether the device is already connected and active; on which device has the most similar radio link to all other devices (which may imply in the geographic centre of the distributed radio); on radio performance (the monitoring device should have an equal or better sensitivity as compared to other devices); or on user preference. Where the decision is made is a complex question, and partly will depend on the topology of the underlying WPAN. A centralised, master controlled network may use the master to determine which device should be the monitor (which may or may not be itself). However, a centralised architecture could still use some form of distributed decision making regarding which device should be the master. Similarly, a decentralised topology may adopt a centralised or decentralised structure for choosing the monitor. In general, it seems that a centralised choice of the monitoring device would be easier to implement, as one device can collate capabilities before making the choice.

Devices within the distributed radio may exchange information about multiple networks, frequency carriers and/or air interface modes. This information encompasses synchronisation information, loading level, network configuration, neighbour cell list, etc. These factors can be used to determine whether to handover to another network, frequency carrier and/or air interface mode.

BRIEF DESCRIPTION OF THE DRAWINGS

Preferred embodiments of the present invention are now described, with reference to the accompanying drawings, in which.

DETAILED DESCRIPTION OF THE INVENTION

Two embodiments of the present invention will now be described. In the first embodiment, the devices within the distributed radio are all connected in the same mode (e.g. all GSM). In the second embodiment, the devices are connected in different modes (e.g. some in GSM and some in W-CDMA).

Figure 1:
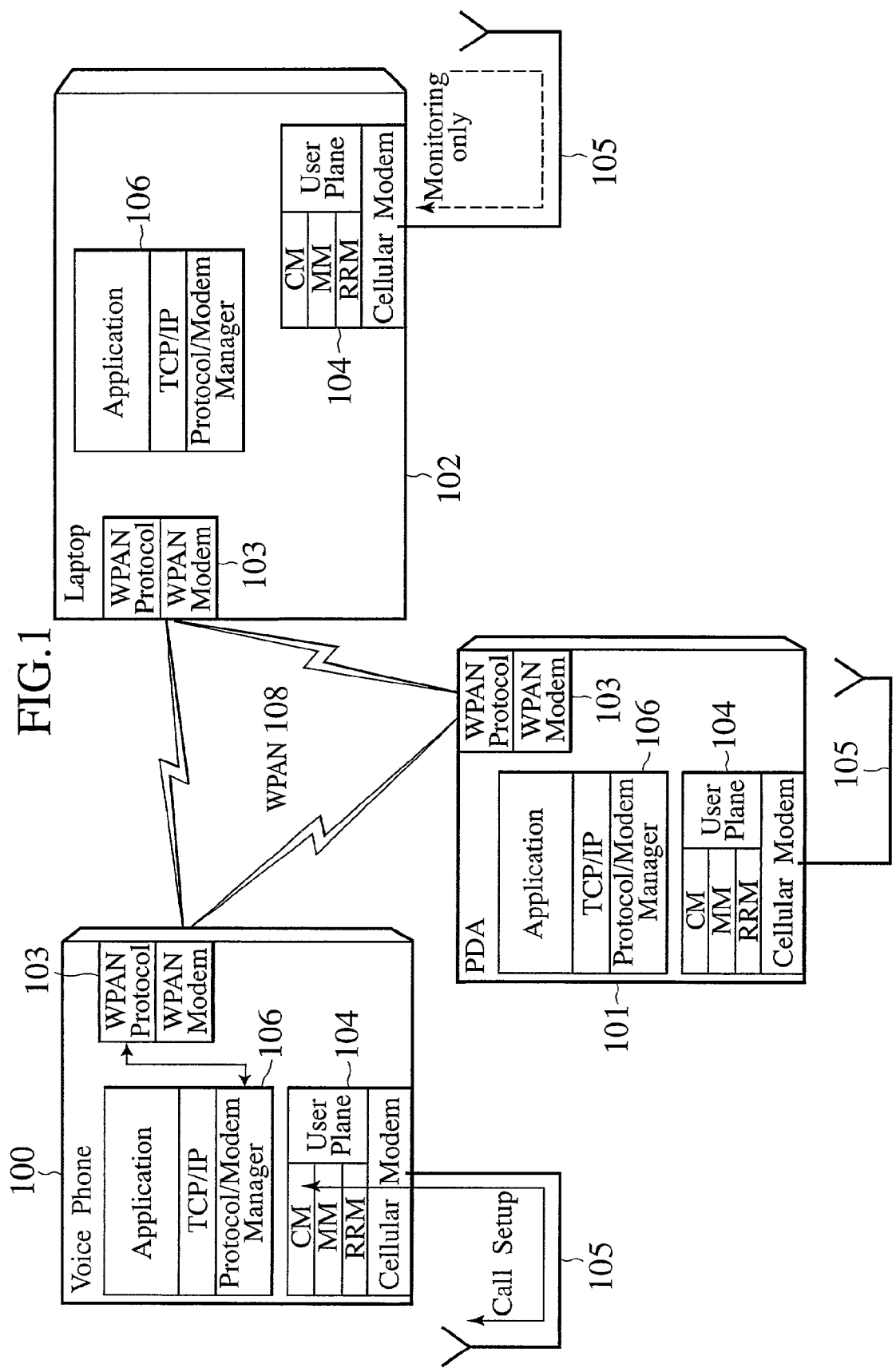
FIG. 1 shows a first embodiment of the invention, in which the devices within the distributed radio are all connected in the same mode.

In a first embodiment of the invention, illustrated in FIG. 1, all devices within the distributed radio are connected to a radio network in the same mode. One device monitors the network and shares relevant network information with other devices within the distributed wireless system. This information could include (but is not limited to) paging messages, synchronisation, neighbour cell (or access point) monitoring.

In this embodiment, sharing of network monitoring information reduces power consumption for the devices that are not currently active. This may allow user devices to enter a low power mode, where no communication with the network occurs directly, and instead, network information is routed via the low-power WPAN link.

This can also be exploited to reduce requirements on the network. For example, a terminal operating in W-CDMA in dedicated mode may require the use of compressed mode to monitor other W-CDMA carriers (allowing the terminal to handover to them). This needs additional computation within the terminal and requires the network to schedule compressed mode operation. Here, this information can be obtained from another terminal connected within the distributed radio, reducing power consumption and network requirements.

In FIG. 1, three radio devices are shown, linked by a WPAN 108—a voice phone 100, a PDA 101, and a laptop computer 102. Each device comprises a WPAN module 103, a radio network module 104, and a radio antenna 105. The radio network module 104 includes means for connection management (CM), mobility management (MM) and radio resource management (RRM). Each device initiates registration on the radio network, either directly or by one device registering all other devices. Each device should now be camped on, i.e. ready to make a call. The protocol managers 106 of the devices then make a collective decision about what the optimum monitoring configuration should be. In the example shown, it is decided that the laptop 102 should do all the monitoring. The laptop 102 now listens for all paging messages for all devices within the distributed radio. When the radio environment changes (e.g. more base stations become visible) or when updated cell information becomes available, this information is passed to the remaining devices via the WPAN link 108. When an incoming paging request is received for the phone 100, details and timing information is passed to the phone 100 via the WPAN 108. The phone 100 accepts the paging request and using timing information from the laptop 102, synchronises to the network and initiates random access and call set-up via its own modem in the radio network module 104. An alternative would be for the laptop 102 to issue the random access request on behalf of the phone 100, whilst the phone 100 is synchronising. The phone 100 now enters connected mode. Due to the new configuration (the phone 100 is now connected), it may be necessary to update the designated monitoring device. If devices leave (or enter) the distributed radio, it may be necessary to reconfigure and reassign the role of monitoring device. Alternatively, if the environment changes (e.g. the monitoring device moves away from the other devices) it may be necessary to reconfigure.

Figure 2:
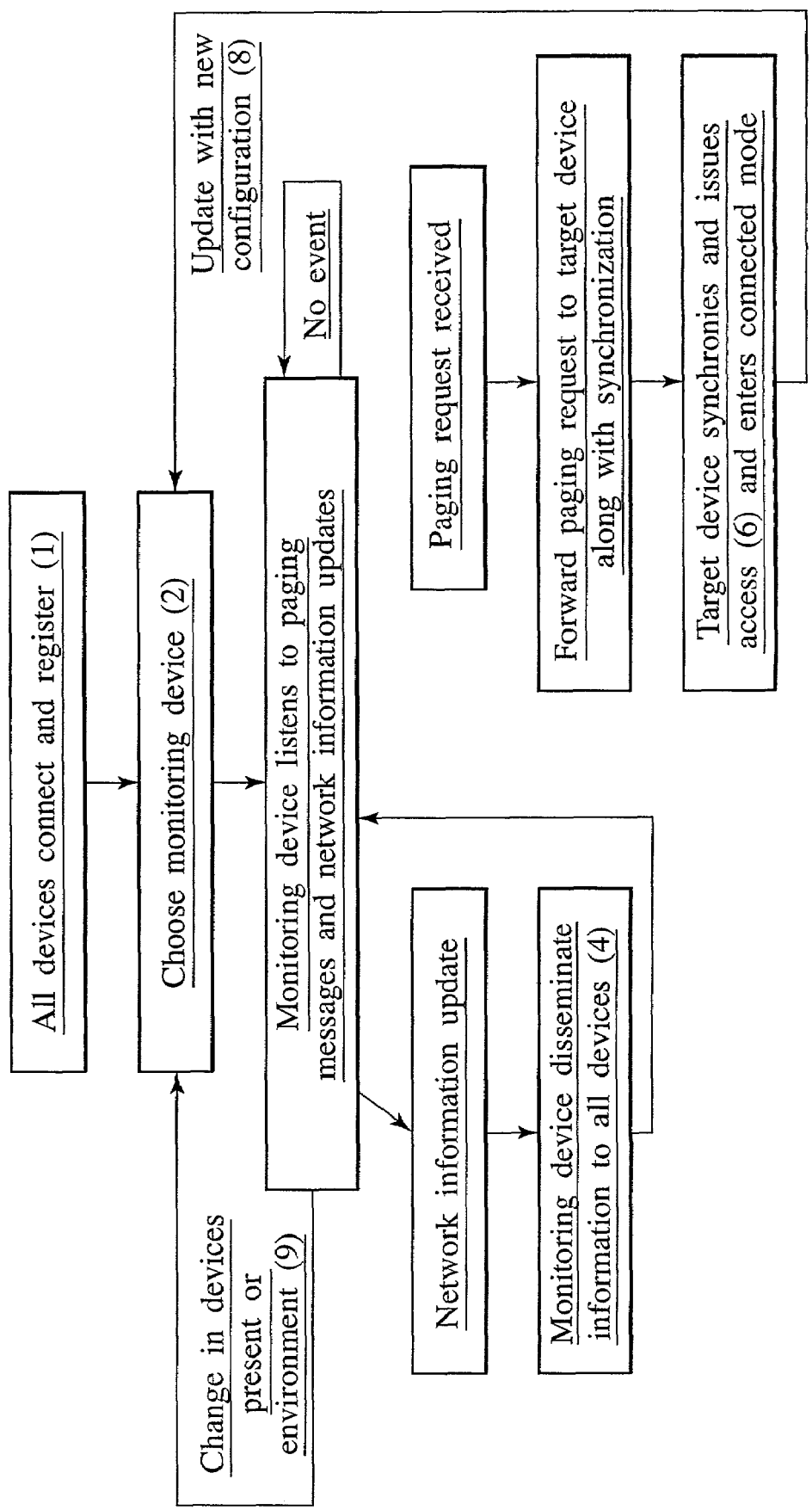
FIG. 2 shows a flow chart summarising the steps taken by the distributed radio in the first embodiment of the invention.

The steps taken by the distributed radio in this first embodiment are summarised in the flow chart shown in FIG. 2.

Figure 3:
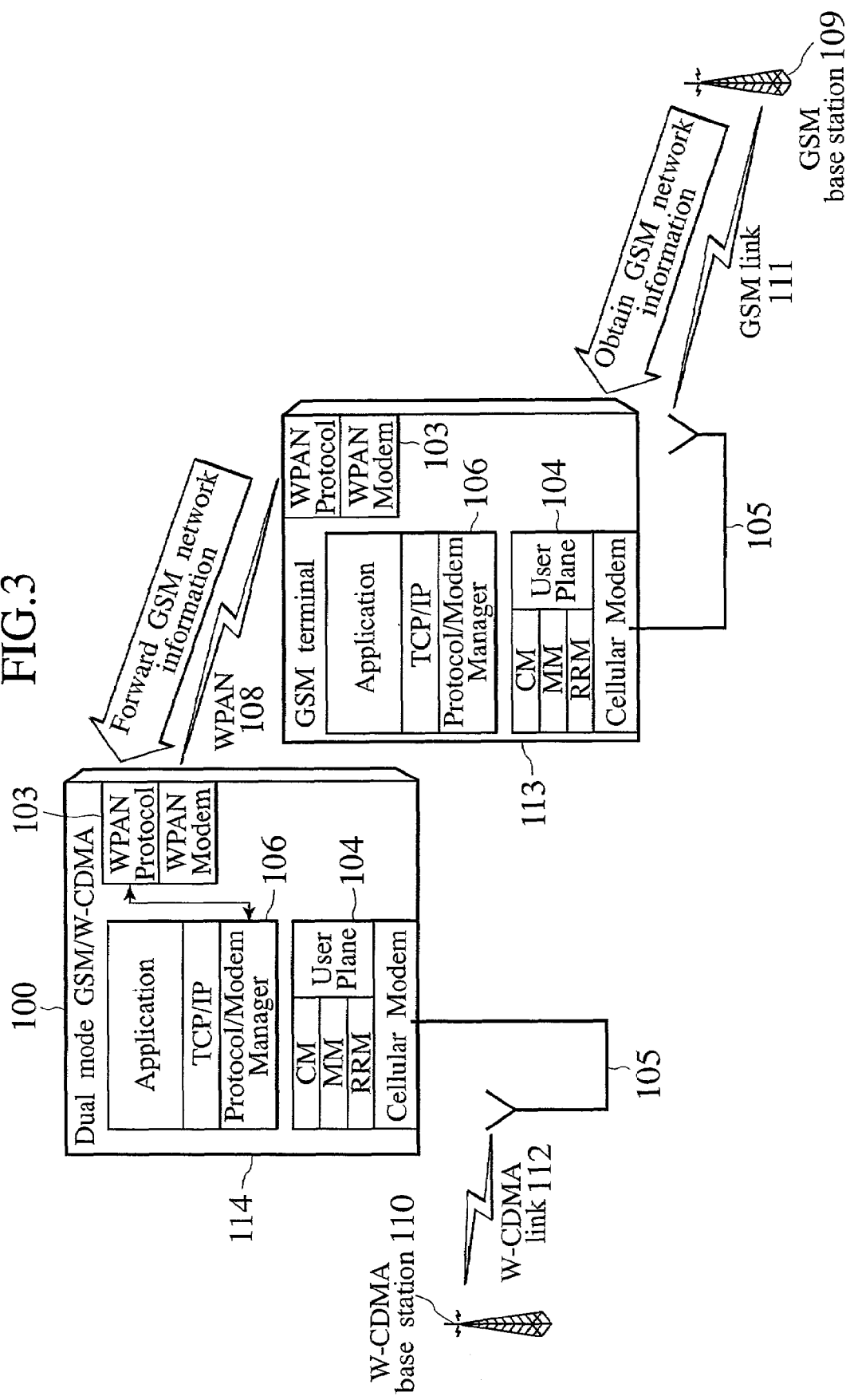
FIG. 3 shows a second embodiment of the invention, in which the devices within the distributed radio are connected in different modes.

A second embodiment of the invention is shown in FIG. 3, in which different air interface modes are used within the distributed wireless system. In this case, information can be obtained through the distributed radio to facilitate mode handover. Unlike the previous example, it is more likely that the information exchange will be a one-off event (preceding inter-mode handover, for example) rather than a continuous series of events. Again, the user does not need to derive the information of other modes directly (e.g. GSM monitoring during compressed mode in W-CDMA). Instead, devices within the distributed radio which are connected using different air interface modes share information on the current serving base station, neighbour cell lists for that mode/network, etc. It may be necessary for there to be some degree of location awareness within the devices, as it can only be assumed that all devices within the distributed radio can connect to the same mode/network if they are relatively close. This location awareness could be limited to a simple indication of range between monitoring and recipient devices; if this range is below a certain threshold, then the information is assumed to be valid and can be applied. A very simple measure of range would assume that if all the devices are connected, and the transmit power is sufficiently low, then the geographical extent of the WPAN network will be small. A more complex method is to use location equipped devices (with e.g. GPS) and exchange this information as part of the information exchange. However, range will not necessarily give the best view of homogeneity from the radio access point of view. For example, with two devices which are very close (and therefore have a good WPAN link), one may be obscured from the base station by a building corner, while the other is not. Generally, a more reliable technique may be the parallel measurement method, where the recipient device does a similar measurement to the monitoring device, to ensure the validity of the link. It may be possible to determine the relative homogeneity of the WPAN network by a simple examination of a received signal strength indicator (RSSI) coupled with knowledge of antenna gains and transmitted power. It is desirable not only to measure the similarity of the radio environments, but also the similarity of their rates of change. This could be extended to say that a variable time threshold could be set for retesting similarity. If, for example, the environments are similar and not changing then the devices can share information for a long time before rechecking the environment. If the radio environment is rapidly changing then the time period may have to be shortened.

In FIG. 3, two radio devices 113, 114 are illustrated. One of these is connected in GSM mode to a GSM base station 109 via a GSM link 111, whilst the other is in W-CDMA mode connected to a W-CDMA base station 110 via a W-CDMA link 112. The W-CDMA device 114 is a dual mode terminal, also capable of operation in GSM mode, and in the example shown is in a state when handover to GSM is desirable (e.g. poor coverage for W-CDMA in this region). The relevant information regarding whether to hand over to GSM, whether connection is permitted by the operator, appropriate base stations, channel configuration, etc. is obtained directly from the GSM device 113. Since the GSM device 113 is already connected in this mode, and to the relevant network, no additional monitoring is required. The overheads required for this operation are the power consumed by the WPAN system to forward on the relevant network information.

In this second embodiment, the dual mode device 114 issues a paging request (and e.g. associated service discovery protocol) to establish if any WPAN-equipped devices in the vicinity have network information that it requires. Another device can then respond if it has the relevant information. This response may indicate details of the available information (network type and operator, etc.). The dual mode device 114 selects one or more monitoring devices from those who have responded to the request (in this case from the GSM device 113), and elicits the required information. The particular device(s) chosen to provide network information depends on a number of factors, for example on whether a relevant network type and operator is supported, and on the relative range. The selected monitoring devices forward the desired information to the recipient device. Thus in FIG. 2, the GSM device 113 provides GSM network information for the dual mode device 114. Thus the entire exchange of information on network capability and of network information is performed via the WPAN link, and may occur simultaneously with established dedicated link(s) in the connected device(s).

Figure 4:
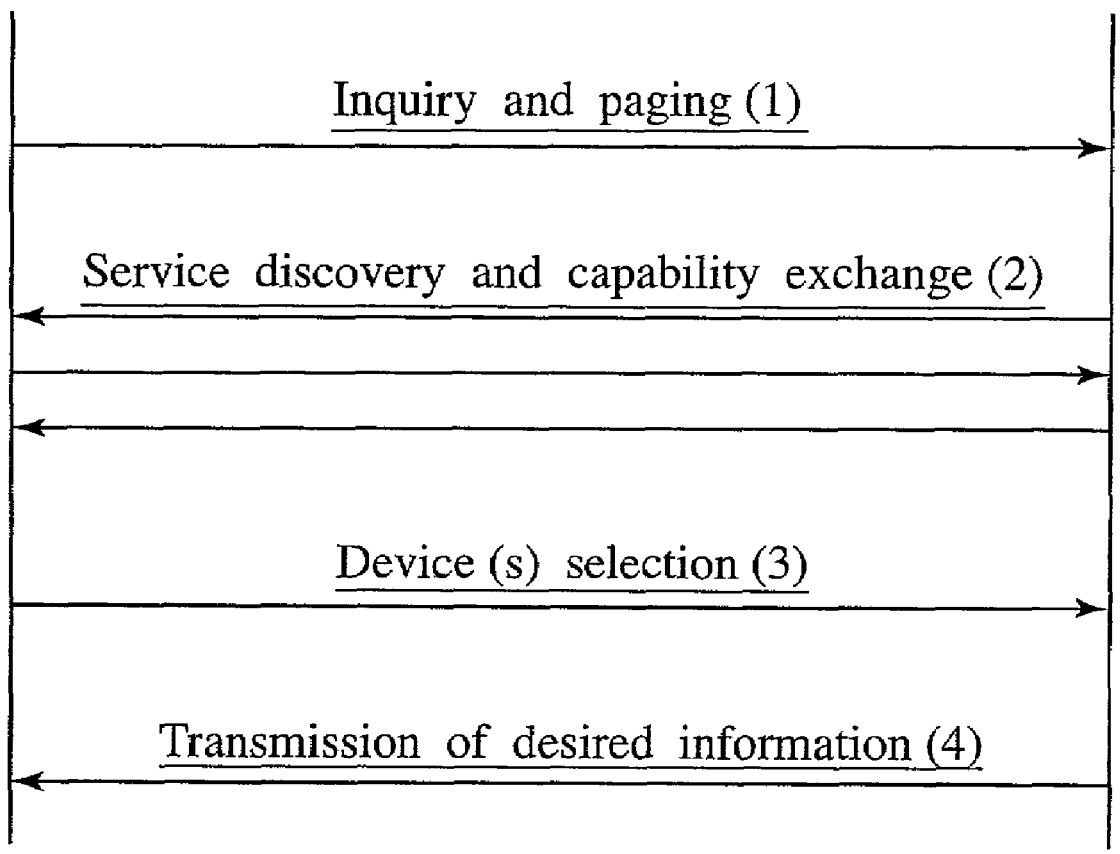
FIG. 4 shows a flow chart summarising the steps taken by the distributed radio in the second embodiment of the invention.

The steps taken by the distributed radio in this second embodiment are summarised in the flow chart shown in FIG. 4.

Thus, the present invention provides a system for reducing the bandwidth required for portable devices to communicate with a base station over a radio network. In addition, by avoiding power hungry communications with a distant base station of a network, the battery consumption of portable radio devices can be considerably reduced. The invention also allows a reduction in the computational requirements of a portable radio device for scheduling and monitoring, in particular, potentially eliminating the need to use compressed mode W-CDMA. The system additionally provides a method of error checking and/or error correction by comparing the radio signals received on the same channel by more than one radio device as well as providing a method of checking the quality and uniformity of the radio environment by comparing the radio signals received on the same channel by more than one radio device.

What is claimed is:

1. A distributed wireless communication system comprising:
    a base station or access point covering a first network; and
    a plurality of communication devices each including:
        a first communication unit configured to communicate with the base station or access point over the first network;
        a second communication unit configured to communicate with other communication devices over a second network in which a short-range wireless link is established between the communication device and lower power consumption is required than that when the first communication unit communicates with the base station or access point over the first network; and
        a monitoring-device managing unit configured to select at least one of the other communication devices as at least one monitoring device;
    wherein the at least one monitoring device receives network information specifying details of the first network from the base station or access point over the first network and sends the network information over the second network to communications devices that were not selected as the at least one monitoring device, and the first communication units in the communication devices that were not selected as the at least one monitoring device have suspended communication over the first network,
    wherein each of the communication devices that were not selected as the at least one monitoring device and the first communication units with suspended communication over the first network periodically return to a monitoring mode in which the first communication units restart the communication over the first network and receive the network information from the base station or access point, and
    wherein the communication device that periodically returns to the monitoring mode compares the network information received from the at least one monitoring device and the network information which the communication device itself received.

2. A distributed wireless communication system comprising:
    a base station or access point covering a first network; and
    a plurality of communication devices each including:
        a first communication unit configured to communicate with the base station or access point over the first network;
        a second communication unit configured to communicate with other communication devices over a second network in which a short-range wireless link is established between the communication device and lower power consumption is required than that when the first communication unit communicates with the base station or access point over the first network; and
        a monitoring-device managing unit configured to select at least one of the other communication devices as at least one monitoring device;
    wherein the at least one monitoring device receives network information specifying details of the first network from the base station or access point over the first network and sends the network information over the second network to communications devices that were not selected as the at least one monitoring device, and the first communication units in the communication devices that were not selected as the at least one monitoring device have suspended communication over the first network, and
    wherein when one of the communication devices that was not selected as the at least one monitoring device is connected to the first network using an air interface mode different from that with which the at least one monitoring device is connected to the first network, and the one of the communication devices is required to hand over to the air interface mode the at least one monitoring device uses, the one of the communication devices receives information necessary to hand over to the air interface mode from the at least one monitoring device.

3. A distributed wireless communication method employed in a communication system comprising: a base station or access point covering a first network; and a plurality of communication devices each including: a first communication unit configured to communicate with the base station or access point over the first network; and a second communication unit configured to communicate with other communication devices over a second network in which a short-range wireless link is established between the communication devices and lower power consumption is required than that when the first communication unit communicates with the base station or access point over the first network, the method comprising:

selecting at least one of the other communication devices as at least one monitoring device by the plurality of communication devices;

receiving network information specifying details of the first network from the base station or access point over the first network by the at least one monitoring device; and sending the network information over the second network from the at least one monitoring device to communication devices that were not selected as the at least one monitoring device, and the first communication units in the communication devices that were not selected as the at least one monitoring device have suspended communication over the first network, wherein each of the communication devices that was not selected as the at least one monitoring device and the first communication units with suspended communication over the first network periodically return to a monitoring mode in which the first communication units thereof restart the communication over the first network and receive the network information from the base station or access point, and wherein the communication device that periodically returns to the monitoring mode compares the network information received from the at least one monitoring device and the network information which the communication device itself received.

4. A distributed wireless communication method employed in a communication system comprising: a base station or access point covering a first network; and a plurality of communication devices each including: a first communication unit configured to communicate with the base station or access point over the first network; and a second communication unit configured to communicate with other communication devices over a second network in which a short-range wireless link is established between the communication devices and lower power consumption is required than that when the first communication unit communicates with the base station or access point over the first network, the method comprising:

selecting at least one of the other communication devices as at least one monitoring device by the plurality of communication devices;

receiving network information specifying details of the first network from the base station or access point over the first network by the at least one monitoring device; and sending the network information over the second network from the at least one monitoring device to communication devices that were not selected as the at least one monitoring device, and the first communication units in the communication devices that were not selected as the at least one monitoring device have suspended communication over the first network, wherein when one of the communication devices that was not selected as the at least one monitoring device is connected to the first network using an air interface mode different from that with which the at least one monitoring device is connected to the first network, and the one of the communication devices is required to hand over to the air interface mode the at least one monitoring device uses, the one of the communication devices receives information necessary to hand over to the air interface mode from the at least one monitoring device.

* * * * *